United States Patent [19]

Inoue et al.

[11] Patent Number: 4,814,187
[45] Date of Patent: Mar. 21, 1989

[54] HONEYCOMB STRUCTURAL BODY-EXTRUDING DIE APPARATUS

[75] Inventors: Satoru Inoue, Hazu; Kozo Higashizima, Nagoya, both of Japan

[73] Assignee: NGK Insulators, Ltd., Nagoya, Japan

[21] Appl. No.: 129,137

[22] Filed: Dec. 7, 1987

[30] Foreign Application Priority Data

Jan. 13, 1987 [JP] Japan .................. 62-2486

[51] Int. Cl.⁴ ............................................. B29C 47/30
[52] U.S. Cl. ............................ 425/464; 264/177.12; 425/198
[58] Field of Search .................. 425/198, 463, 464; 264/177.12; 366/87; 428/116

[56] References Cited

U.S. PATENT DOCUMENTS

| | | | |
|---|---|---|---|
| 3,457,342 | 7/1969 | Parr et al. | 425/198 X |
| 3,480,997 | 12/1969 | List | 425/198 X |
| 3,836,302 | 9/1974 | Kaukeinen | 425/461 X |
| 3,881,984 | 5/1975 | Soda et al. | 425/463 X |
| 3,888,963 | 6/1975 | Orso et al. | 264/211.11 |
| 4,368,025 | 1/1983 | Naito et al. | 264/177.12 X |
| 4,468,365 | 8/1984 | Corbett et al. | 425/198 X |
| 4,668,176 | 5/1987 | Zeibig et al. | 425/464 |

FOREIGN PATENT DOCUMENTS

| | | |
|---|---|---|
| 53-104609 | 9/1978 | Japan . |
| 55-35132 | 8/1980 | Japan . |
| 58-23207 | 5/1983 | Japan . |
| 59-10289 | 3/1984 | Japan . |
| 59-66509 | 4/1984 | Japan .................. 425/463 |
| 59-46763 | 11/1984 | Japan . |
| 59-53844 | 12/1984 | Japan . |

Primary Examiner—Richard L. Chiesa
Attorney, Agent, or Firm—Parkhurst, Oliff & Berridge

[57] ABSTRACT

A honeycomb structural body-extruding die apparatus is disclosed herein, which includes an extruding die and a die mask provided around an outer peripheral portion of the extruding die on an extruding material outlet side. The extruding die also includes a plurality of extruding material-feeding holes formed on the extruding material inlet side and a plurality of shaping channels formed communicating with each other in a lattice fashion on the extruding material outlet side. The honeycomb structural body-extruding die apparatus is further provided with an annular perforated plate arranged concentrically with the extruding die on the extruding material inlet side. The perforated plate has through holes of which respective central axes are in conformity with those of the extruding material feeding holes.

6 Claims, 2 Drawing Sheets

FIG_1
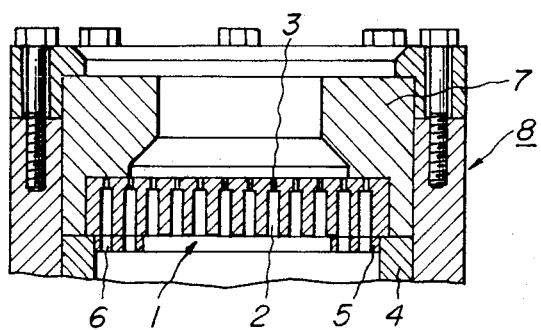
FIG_2a
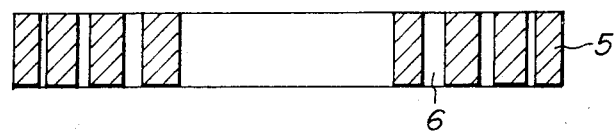
FIG_2b
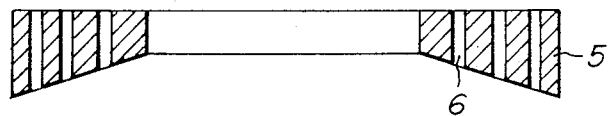
FIG_2c
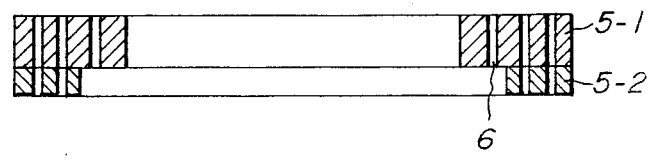

FIG_3
PRIOR ART
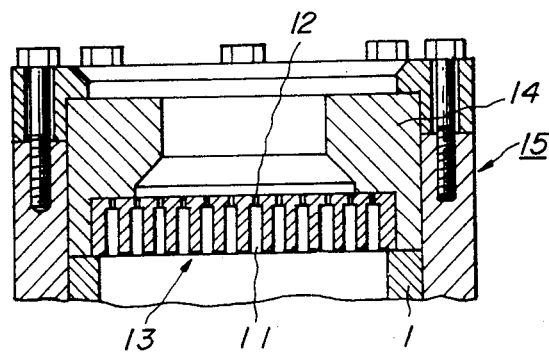
FIG_4
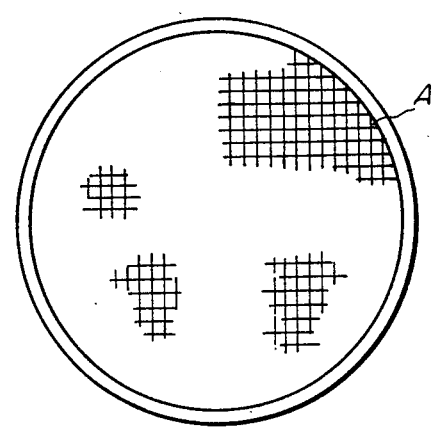

HONEYCOMB STRUCTURAL BODY-EXTRUDING DIE APPARATUS

BACKGROUND OF THE INVENTION (b 1) Field of the Invention:

The present invention relates to a honeycomb structural body-extruding die apparatus which can produce honeycomb structures of a good quality.

(2) Related Art Statement:

Heretofore, honeycomb structures have been produced by a honeycomb structural body-extruding die apparatus shown in FIG. 3, which comprises an extruding die 13 with holes 11 for feeding a material to be extrusion-shaped (hereinafter referred to as "extruding material-feeding holes"), which holes are formed on an extruding material inlet side, as well as shaping channels 12 communicated to one another in a lattice fashion on an extruding material outlet side, and a die mask 14 provided around the outer periphery of an end face of the extruding die 13 on the extruding material outlet side.

In the above-mentioned conventional apparatus, since an outer peripheral wall is formed by squeezing the extruding material having passed through the outer peripheral portion of the extruding die at a tapered inner peripheral wall of the die mask 14, a speed of discharging the extruding material through the shaping channels of the die is greater at the outer peripheral portion than at the central portion. Therefore, there is a drawback in that cell deformation is likely to appear in an obtained honeycomb structural body near the outer peripheral wall thereof as seen at a portion "A" in FIG. 4. In order to eliminate such a drawback, Japanese patent publication No. 58-23,207 (U.S. Pat. No. 4,368,025) discloses a honeycomb structural body-extruding die apparatus in which a plurality of grooves are opened at a small interval along an inner peripheral edge portion of a die mask in contact with an end face of a die for feeding an extruding material forcedly fed into shaping channels at the peripheral portion of the die to the inside of the die mask.

However, since no attention is paid to a difference in a discharging speed of the fed extruding material between the central portion and the outer peripheral portion in the above die apparatus, either, deformation of cells cannot be completely removed. Further, in the case that a plurality of the openings are provided along the inner periphery of the die mask, the dimension of such openings of the die mask needs to be slightly varied depending upon a shrinkage factor of the extruding material. In addition, to determine where a plurality of such openings are to be provided in what direction for the extrusion of honeycomb structures is extremely troublesome.

SUMMARY OF THE INVENTION

It is an object of the present invention to eliminate the above mentioned drawbacks, and to provide a honeycomb structural body-extruding die apparatus which can easily produce good quality honeycomb structures free from troubles such as cell deformation.

The honeycomb structural body-extruding die apparatus according to the present invention comprises an extruding die which has extruding material-feeding holes formed on an extruding material inlet side and shaping channels communicating with one another in a lattice fashion on an extruding material outlet side, and a die mask provided along an outer periphery of an end face of the extruding die on the extruding material outlet side, wherein an annular perforated plate is provided concentrically with the extruding die on the extruding material inlet side, and the perforated plate has holes of which central axes are in conformity with the corresponding extruding material-feeding holes, respectively.

In the above construction, the speed of the extruding material discharged through the central portion and the peripheral portion of the extruding die is made at a desired constant value by the perforated plate arranged on the extruding material inlet side of the extruding die. Consequently, honeycomb structures of good quality can be obtained free from defects such as cell deformation.

These and other objects, features and advantages of the invention will be appreciated upon reading of the following description of the invention when taken in conjunction with the attached drawings, with the understanding that some modifications, variations, and changes could be made by the skilled person in the art to which the invention pertains without departing from the spirit of the invention or the scope of the claims appended hereto.

BRIEF DESCRIPTION OF THE DRAWINGS

For a better understanding of the invention, reference is made to the attached drawings, wherein:

FIG. 1 is a sectional view of a principal portion of an embodiment of the honeycomb structural body-extruding die apparatus according to the present invention;

FIGS. 2(a) through (c) are sectional views illustrating other embodiments of perforated plates used in the present invention;

FIG. 3 is a sectional view of a principal portion of a conventional honeycomb structural body-extruding die apparatus; and FIG. 4 is a plan view illustrating a defect possessed by a honeycomb structure.

DETAILED DESCRIPTION OF THE INVENTION

A feeding speed of an extruding material varies depending upon a size of a honeycomb structural body-extruding apparatus, a composition of the extruding material, etc. However, optimum extruding conditions may be selected to effect an extruding operation by preliminarily preparing plural kinds of annular perforated plates for an extruding die and selectively attaching an appropriate perforated plate to the die. At that time, the feeding speed of the extruding material is finely adjusted by the perforated plate, preferably, according to a technique by which a diameter of holes of the perforated plate is varied, the inner diameter of the annular perforated plate is changed, or the thickness of the perforated plate is changed.

The present invention will be explained in more detail with reference to the following specific embodiments. However, these embodiments are merely given in illustration of the invention, but they should never be interpreted to limit the scope of the invention.

FIG. 1 is a sectional view of a principal portion of an embodiment of the honeycomb structural body-extruding die apparatus according to the present invention. In the illustrated embodiment, the extruding die 1 is constituted by extruding material-feeding holes 2 formed on an extruding material inlet side and shaping channels 3 which communicate with one another in a lattice fashion on an extruding material outlet side. An annular perforated plate 5 is concentrically arranged inside a cylinder 4 on the extruding material inlet side of the extruding die 1. The perforated plate 5 is fixed to the extruding die 1 by means of screws or a jig (not shown) such that respective center axes of through holes 6 of the perforated plate 5 may be in conformity with those of the extruding material-feeding holes 2 of the extruding die 1. The honeycomb structural body-extruding die apparatus according to the present invention is constituted by the extruding die 1, the perforated plate 5, the cylinder 4 and the die mask 7.

FIGS. 2(a) through 2(c) are sectional views illustrating other embodiments of perforated plates 5 used in the present invention. In the embodiment of FIG. 2(a), the diameter of through holes 6 of the perforated plate 5 is made smaller toward the outer peripheral portion thereof so that the feeding speed of the extruding material is made greater at the inner peripheral portion of the perforated plate and smaller at the outer peripheral portion. In the embodiment illustrated in FIG. 2(b), the thickness of the perforated plate 5 is made larger toward the outer peripheral portion so that the feeding speed of the extruding material is made greater at the inner peripheral portion of the perforated plate and smaller at the outer peripheral portion. In the embodiment shown in FIG. 2(c), the perforated plate 5 is constituted by two perforated annular plate members 5-1 and 5-2 and the inner diameter of the annular perforated plate member 5-1 in contact with the extruding die is made smaller than that of the perforated plate member 5-2 so that the feeding speed of the extruding material is made greater at the inner peripheral portion of the perforated plate 5 and smaller at the outer peripheral portion.

In the above-illustrated honeycomb structural body-extruding die apparatus of the present invention, the speed of the extruding material, such as a ceramic body, which is discharged through the shaping channels of the die, may be controlled to be constant at every location by passing the extruding material through the perforated plate, when the extruding material passes through the extruding die. That is, when optimum perforated plates 5 are preliminarily determined correspondingly to changes in conditions such as a composition and a viscosity of an extruding material used, an inner diameter of a cylinder 4, etc. and the perforated plate 5 is exchanged depending upon the extruding material, etc., the discharging speed of the extruding material through the extruding die 1 on the extruding material outlet side can always be made constant. Consequently, when the outer periphery of the ceramic structure is formed by using the die mask 7, defects such as the cell deformation do not occur and the thickness of the cells can be made smaller.

The present invention will not be limited to the above-mentioned embodiments only, and various modifications, variations, and changes of the same could be made. For example, in the above-mentioned embodiments, the outer walls of the honeycomb structures are formed by the die mask having a tapered portion. The outer walls may be formed by other appropriate conventional techniques. Although the perforated plates are exchangeably formed separately from the extruding die in the above embodiments, similar effects aimed at by the present invention may be obtained even when perforated plate may be integrally formed with the dies if exchange is unnecessary.

As obvious from the foregoing detailed description, according to the honeycomb structural body-extruding die apparatus of the present invention, even when the extruding material passing through the outer periphery of the extruding die is squeezed to form the outer peripheral wall, the feeding speed of the extruding material on the extruding material outlet side of the extruding die can be made constant by providing the perforated plate concentrically with the extruding die on the extruding material inlet side. Therefore, the good quality honeycomb structures can be obtained free from defects such as cell deformation.

Further, since the speed at which an extruding material passes through the die may be easily varied by changing the shape or the like of the perforated plate, the extruding apparatus most suitable for the extruding material used can be obtained only by a simple operation of exchanging the perforated plate.

What is claimed is:

1. A honeycomb structural body-extruding die apparatus comprising:
   an extruding die having an extruding material inlet side and an extruding material outlet side, said inlet side having material-feeding holes formed therein in communication with shaping channels formed in said outlet side, said shaping channels being in communication with one another to form a lattice;
   a tapered die mask positioned along an outer peripheral portion of said extruding material outlet side; and
   an annular perforated plate concentrically positioned on the extruding material inlet side of said extruding die, said perforated plate having a plurality of substantially annular rows of holes, said holes having respective center axes in conformity with those of at least a plurality of extruding material feeding holes located at said outer peripheral portion of said extruding material outlet side of said extruding die.

2. A honeycomb structural body-extruding die apparatus acording to claim 5, wherein the diameter of the holes in the perforated plate are varied to control an amount of extruding material supplied to the extruding die.

3. A honeycomb structural body-extruding die apparatus according to claim 5, wherein an inner diameter of the annular perforated plate is varied to control an amount of extruding material supplied to the extruding die.

4. A honeycomb structural body-extruding die apparatus according to claim 5, wherein an axial thickness of the perforated plate is varied to control an amount of extruding material supplied to the extruding die.

5. A honeycomb structural body-extruding die apparatus comprising:
   an extruding die having an extruding material inlet side and an extruding material outlet side, said inlet side having material-feeding holes formed therein in communication with shaping channels formed in said outlet side, said shaping channels being in communication with one another to form a lattice;
   a tapered die mask positioned along an outer peripheral portion of said extruding material outlet side; and
   an annular perforated plate concentrically positioned on the extruding material inlet side of said extruding die, said perforated plate having a plurality of substantially annular rows of holes, said holes having respective center axes in conformity with those of at least a plurality of extruding material feeding holes located at said outer peripheral portion of said extruding material outlet side of said extruding die;

wherein the diameters of the holes in the perforated plate in an annular row proximate an inner portion of the perforated plate are substantially equal to the diameters of the extruding material feeding holes and the diameters of the holes in the perforated plate in the remaining annular rows progressively decrease, such that the holes proximate said inner portion are larger than the hole proximate an outer portion of the perforated plate.

6. A honeycomb structural body-extruding die apparatus comprising:

an extruding die having an extruding material inlet side and an extruding material outlet side, said inlet side having material-feeding holes formed therein in communication with shaping channels formed in said outlet side, said shaping channels being in communication with one another to form a lattice;

a tapered die mask positioned along an outer peripheral portion of said extruding material outlet side;

a first annular perforated plate concentrically positioned on the extruding material inlet side of said extruding die, said perforated plate having a plurality of substantially annular rows of holes, said holes having respective center axes in conformity with those of at least a plurality of extruding material feeding holes located at said outer peripheral portion of said extruding material outlet side; and a second annular perforated plate concentrically positioned on an extruding material inlet side of said first annular perforated plate, said second annular perforated plate having a plurality of substantially annular rows of holes, said holes having respective center axes in conformity with those of at least a plurality of holes located at an outer peripheral portion of said first annular perforated plate.

* * * * *